(12) United States Patent
Mueller et al.

(10) Patent No.: US 12,408,023 B2
(45) Date of Patent: Sep. 2, 2025

(54) USE OF A COMMUNICATION PROFILE BY A PLURALITY OF MOBILE TERMINALS

(71) Applicant: Bayerische Motoren Werke Aktiengesellschaft, Munich (DE)

(72) Inventors: Thomas Mueller, Munich (DE); Michael Neuhaeuser, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 371 days.

(21) Appl. No.: 17/433,315

(22) PCT Filed: Feb. 5, 2020

(86) PCT No.: PCT/EP2020/052823
§ 371 (c)(1),
(2) Date: Aug. 24, 2021

(87) PCT Pub. No.: WO2020/239273
PCT Pub. Date: Dec. 3, 2020

(65) Prior Publication Data
US 2022/0141649 A1    May 5, 2022

(30) Foreign Application Priority Data
May 24, 2019   (DE) .................... 10 2019 113 967.8

(51) Int. Cl.
*H04W 8/24* (2009.01)
*H04W 8/18* (2009.01)
*H04W 88/06* (2009.01)

(52) U.S. Cl.
CPC .............. *H04W 8/24* (2013.01); *H04W 88/06* (2013.01)

(58) Field of Classification Search
CPC ....... H04W 8/183; H04W 8/24; H04W 88/06; H04W 8/18; H04W 8/20; H04W 8/205; H04W 8/28
See application file for complete search history.

(56) References Cited

U.S. PATENT DOCUMENTS 10,848,589 B2 * 11/2020 Park ...................... H04W 12/35
10,911,939 B2 *  2/2021 Zhang ........................ G06F 8/61
(Continued)

OTHER PUBLICATIONS

International Search Report (PCT/ISA/210) issued in PCT Application No. PCT/EP2020/052823 dated Apr. 6, 2020 with English translation (four (4) pages).
(Continued)

*Primary Examiner* — Khawar Iqbal
(74) *Attorney, Agent, or Firm* — Crowell & Moring LLP

(57) ABSTRACT

A mobile terminal includes a communication device to communicate with an external entity, a storage device to store an identifier, and a processing device. The processing device activates a communication profile, transmits a notification relating to the activation to an external entity, and stores an identifier of the activation in the storage device. The processing device further receives a deactivation request and an identifier from the external entity and deactivates the communication profile if the received identifier corresponds to the stored identifier. The identifier can be determined by the mobile terminal and transmitted from the mobile terminal to the external entity. The identifier can also be determined by the external entity and transmitted to the mobile terminal.

7 Claims, 2 Drawing Sheets

(56) References Cited

U.S. PATENT DOCUMENTS

| | | | | |
|---|---|---|---|---|
| 11,617,073 B2* | 3/2023 | Ullah | ............... | H04W 8/24 |
| | | | | 370/329 |
| 2013/0007278 A1 | 1/2013 | Srinvasan | | |
| 2014/0323117 A1* | 10/2014 | Holtmanns | ............ | H04W 8/22 |
| | | | | 455/418 |
| 2015/0099562 A1* | 4/2015 | Xiong | ............... | H04W 12/04 |
| | | | | 455/558 |
| 2016/0088465 A1 | 3/2016 | Golla | | |
| 2017/0031741 A1* | 2/2017 | Seigel | ............... | G06F 11/0709 |
| 2018/0070201 A1* | 3/2018 | Golla | ............... | H04W 8/205 |
| 2019/0327603 A1* | 10/2019 | De Figueiredo Junior | ............... | |
| | | | | H04L 41/08 |
| 2020/0021980 A1* | 1/2020 | Schouler | ............ | H04W 8/205 |
| 2020/0120494 A1* | 4/2020 | Fares | ............... | H04W 8/18 |
| 2020/0275262 A1* | 8/2020 | Su | ............... | H04W 8/26 |
| 2020/0314628 A1* | 10/2020 | Panchal | ............ | H04L 41/5022 |
| 2020/0359212 A1* | 11/2020 | Chen | ............... | H04L 63/102 |
| 2022/0014927 A1* | 1/2022 | Thorn | ............... | H04W 12/35 |
| 2024/0040382 A1* | 2/2024 | Fares | ............... | H04W 8/18 |

OTHER PUBLICATIONS

German-language Written Opinion (PCT/ISA/237) issued in PCT Application No. PCT/EP2020/052823 dated Apr. 6, 2020 (eight (8) pages).

German-language Search Report issued in German Application No. 10 2019 113 967.8 dated Jan. 9, 2020 with partial English translation (11 pages).

* cited by examiner

USE OF A COMMUNICATION PROFILE BY A PLURALITY OF MOBILE TERMINALS

BACKGROUND AND SUMMARY OF THE INVENTION

The present subject matter relates to the use of mobile terminals. In particular, the present subject matter relates to the activation and deactivation of communication profiles in the mobile terminals.

For communication in a mobile radio network, a mobile terminal requires a communication profile which can be stored in a SIM (Subscriber Identity Module) in the terminal. In one embodiment, the communication profile may also be downloaded to an eSIM. Occasionally, a plurality of terminals may have the same communication profile. It may be useful to allow only one of the terminals to use the communication profile at any time.

A terminal can activate (enable) or deactivate (disable) a communication profile. After activation, the terminal can notify an external entity of the activation. If activation of the communication profile by another terminal is known there, it can transmit a deactivation request to the other terminal.

If one of the terminals goes outside a range of the mobile radio network, this synchronization may be disrupted and more than one terminal or no terminal at all may comprise an activated communication profile.

An object on which the present subject matter is based is to specify an improved technique for coordinating mobile terminals to ensure only single use of a communication profile.

According to an aspect of the present subject matter, a method for controlling a mobile terminal comprises steps of activating a communication profile of the terminal; transmitting a notification relating to the activation to an external entity; storing an identifier for the activation; receiving a deactivation request and an identifier; and deactivating the communication profile if the received identifier corresponds to the stored identifier.

Using an identifier makes it possible to ensure that a deactivation request which has been overtaken in the meantime and is delivered to the terminal with a delay is not executed. Erroneous deactivation of the communication profile in the terminal can be avoided. If one of the terminals temporarily cannot be reached, the activated profile therefore also cannot be transferred from a first terminal to a second terminal without manual assistance, for example, by a user of one of the terminals.

In an embodiment, the identifier is determined by the terminal and is transmitted from the terminal to the external entity. The identifier may be transmitted to the external entity together with the notification, in particular. As a result, a number of messages to be transmitted between the terminal and the external entity may be low.

In an embodiment, the identifier is determined by the external entity and is transmitted to the terminal. The transmission is preferably performed in response to the notification. In this case, the identification can be determined by the external entity, thus making it possible to achieve improved consistency of the identification.

An identifier is preferably determined in such a manner that it is possible to determine from two identifiers which was generated first and which was only generated afterward. For this purpose, the identifier may comprise an item of information from a predetermined sequence, in particular a serial number. Alternatively, an identifier may also comprise a type of time stamp which indicates the time at which the communication profile is activated.

The notification may comprise an identification of the terminal. In this case, the external entity is preferably configured to transmit the deactivation request to the terminal assigned to the identification. The identification may also be acquired by the mobile terminal from a surrounding device. For example, the terminal may be fitted on board a motor vehicle and the identification may comprise a vehicle identification number or a similar identification related to the vehicle.

During proactive deactivation of the communication profile, the terminal may transmit a deactivation request containing the identifier to the external entity. In contrast, during deactivation because of a deactivation request, a corresponding message may be transmitted. The external entity is preferably configured to delete a stored identifier corresponding to the received identifier. Proactive deactivation can be carried out, for example, by switching on an airplane mode, manually by a user, or when turning off a surrounding device. Transmitting the deactivation request makes it possible for the external entity to better track which terminal is intended to use the communication profile and which is not.

According to an aspect of the present subject matter, a mobile terminal comprises a communication device for communicating with an external entity; a storage device for storing an identifier; and a processing device. In this case, the processing device is configured to activate a communication profile; to transmit a notification relating to the activation to an external entity; to store an identifier of the activation; to receive a deactivation request and an identifier from the external entity; and to deactivate the communication profile if the received identifier corresponds to the stored identifier.

The processing device may be configured to completely or partially carry out a method described herein.

According to a third aspect of the present subject matter, a motor vehicle comprises a terminal described herein.

According to a fourth aspect of the present subject matter, a method for controlling an external entity comprises steps of the external entity receiving a notification from a mobile terminal relating to its activation of a communication profile; storing an identifier assigned to the activation; determining whether there is an identifier of activation of the same communication profile by another mobile terminal and, in this case, transmitting a deactivation request and the identifier to the other terminal; and deleting the transmitted identifier.

According to a fifth aspect, an external entity comprises a communication device for communicating with a first and a second mobile terminal; a storage device for storing identifiers; and a processing device. In this case, the processing device is configured to receive a notification from the first terminal relating to activation of a communication profile; to store an identifier of the activation; to determine whether there is an identifier of activation of the same communication profile by the second terminal and in this case to transmit a deactivation request and the identifier to the second terminal and to delete the transmitted identifier.

The processing device may be configured to completely or partially carry out a method described herein.

A processing device described herein may comprise a programmable microcomputer, processor, microprocessor, or microcontroller, and a method which can run on it may be in the form of a computer program product having program code means. The computer program product may also be stored on a non-transitory computer-readable data storage medium. Methods described herein can be carried out in an interlaced manner with one another and apparatuses described herein can interact with one another. Features or advantages may be transferred among or between the methods and apparatuses.

DETAILED DESCRIPTION OF THE DRAWINGS

Figure 1:
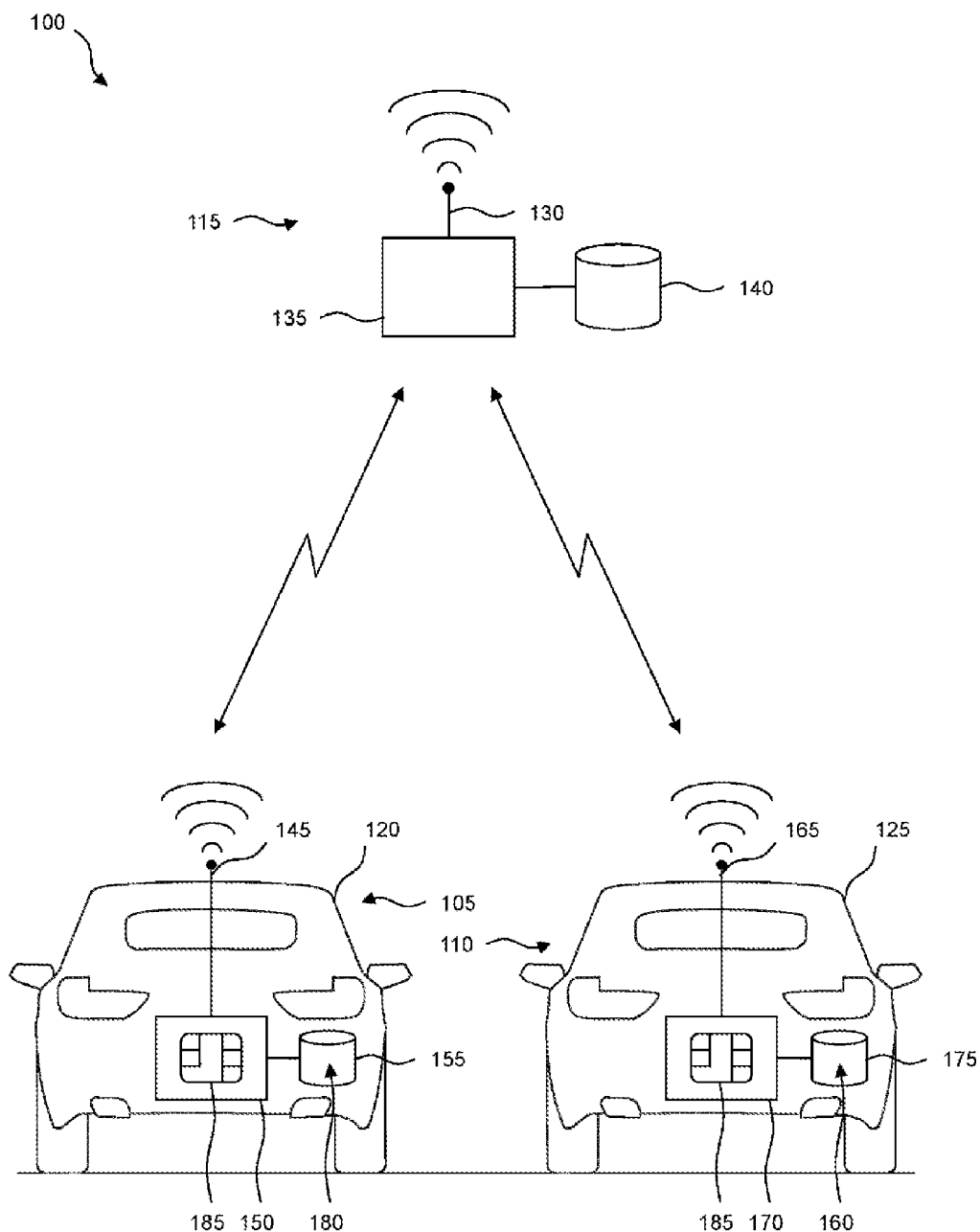
FIG. 1 shows a system in accordance with an embodiment of the present subject matter.

FIG. 1 shows a system 100 comprising a first terminal 105, a second terminal 110 and an external entity 115. More than two terminals 105, 110 are also optionally possible. The first terminal 105 is fitted on board a first vehicle 120 and the second terminal 110 is fitted on board a second vehicle 125, for example. The vehicles 120, 125 each preferably comprise motor vehicles, in particular automobiles. In other embodiments, the terminals 105, 110 may also each be independent or may be integrated in any desired other apparatus, for example a smartphone, a tablet computer, or a laptop computer. The apparatus need not be mobile for technical reasons.

The external entity 115 is fitted outside the vehicles 120, 125 and is usually in the form of a server or service, such as a cloud. The external entity 115 may be assigned to a predetermined number of terminals 105, 110. In one embodiment, the external entity 115 is in the physical vicinity of the terminals 105, 110. The terminals 105, 110 may comprise machines in a hall, for example, and the external entity 115 may be fitted in the region of the hall or may be connected to the latter via a data connection. The external entity 115 preferably comprises a communication device 130, a processing device 135 and a storage device 140, for storing identifiers.

The first mobile terminal 105 preferably comprises a communication device 145, a processing device 150 and a storage device 155 for storing at least one identifier 160. The second mobile terminal 110 preferably comprises a communication device 165, a processing device 170 and a storage device 175. The communication devices 145, 165 are preferably configured to wirelessly communicate with the communication device 130, in particular by means of a mobile radio network. In a further embodiment, one of the terminals 105, 110 may also comprise a communication device 145, 165 for communicating with the external entity 115 and a further communication device for communicating via a mobile radio network. The terminals 105, 110 contain mutually corresponding communication profiles 185 for using the mobile radio network, with the result that both terminals 105, 110 can be reached using the same mobile radio number, for example.

There is the requirement for only one of the terminals 105, 110 to use the communication profile 185 at any time as far as possible. Each terminal 105, 110 can activate its communication profile 185 in order to use it, or can deactivate it. The terms "enable" and "disable" are also used for these processes in technical language.

If a terminal 105, 110 would like to communicate, it activates the communication profile 185 and transmits a notification relating to this to the external entity 115. If communication is intended to be terminated, the terminal 105, 110 can deactivate the communication profile 185 and can transmit a corresponding notification to the external entity 115.

If the external entity 115 detects that the communication profile 185 has been activated more than once, without deactivation having been detected, it can transmit a deactivation request to one of the terminals 105, 110. The request is usually transmitted to the terminal 105, 110 whose activation was furthest back in terms of time.

However, a deactivation request may not reach the terminal 105, 110 if the terminal is outside a range of the mobile radio network. For example, the first vehicle 120 may enter an underground parking garage while the communication profile 185 in the first terminal 105 is active. Another reason may be a lack of energy, for instance if a local energy store has been largely or entirely emptied. If the second terminal 110 then activates the communication profile 185, a deactivation request transmitted by the external entity 115 may not reach the first terminal 105. However, the deactivation request is usually written to a message queue to deliver it later. One queue may be provided at different locations in the communication chain and usually cannot be manipulated by the external device 115 or one of the terminals 105, 110.

In a further embodiment, the queue is configured such that a message, such as a deactivation request, has only a predetermined lifetime, for example in the region of a few seconds. If the message cannot be delivered to the terminal 105, 110 until after its lifetime has expired, it can be deleted from the queue. For this purpose, the queue may evaluate a time at which a new message arrives and an indication of the predetermined lifetime. The lifetime may be permanently predefined or individually assigned to a message. The lifetime may be part of the message.

In the meantime, however, the second mobile device 110 may in turn deactivate the communication profile 185 again. The deactivation request for the first mobile device is out of date as a result and should no longer be executed. If the first vehicle 120 is used again, the communication profile 185 may be activated. A corresponding message for the external entity 115 may possibly not yet be delivered and may be put in a queue. As soon as the first vehicle 120 enters the communication range of the mobile radio network again, the deactivation request from the message queue is delivered and the first terminal 105 deactivates the communication profile 185 again. A user on board the first vehicle 120 can then no longer be reached.

It is proposed to assign an identifier to an activation process and to enclose the identifier of a corresponding activation process in a deactivation request. The terminal 105, 110 can then check whether the identifier of a received deactivation request corresponds to an identifier of an activation process which was last carried out. If this is the case, the communication profile 185 can be deactivated. Otherwise, the deactivation request can be ignored.

Figure 2:
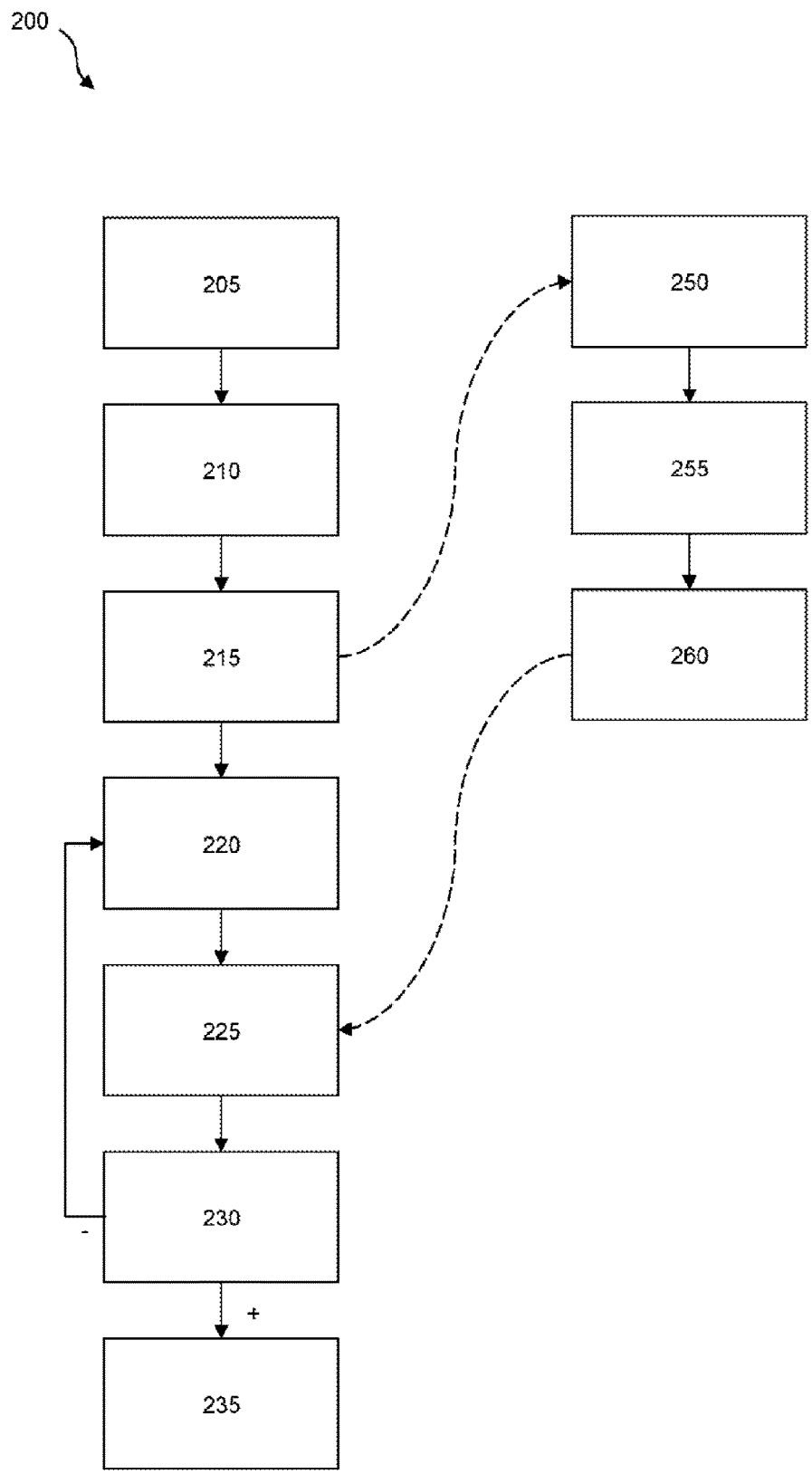
FIG. 2 shows a flowchart of a method in accordance with an embodiment of the present subject matter.

FIG. 2 shows a flowchart of a method 200 which can be carried out in connection with the system 100. A left-hand region illustrates steps which are carried out by one of the terminals 105, 110, for example by the first terminal 105 in the present case. A right-hand region illustrates steps which are carried out by the external entity 115. Two separate methods which are in context with one another may be formed in this manner, as explained in more detail below.

In a step 205, the first terminal 105 activates the communication profile 185, for example because a surrounding device 120 is started up or because a user is accordingly using the terminal 105. In a step 210, an identification 160 for the activation is determined and stored locally. The determined identification 160 differs at least from the identification 160 generated last and preferably from as many identifiers 160 generated in the past as possible. For this purpose, the identifier 160 may follow a sequence and a new element in the sequence may be used. In a simple case, the sequence comprises natural numbers, with the result that a new element can be generated by incrementing the last element. In a step 215, a message relating to the activation and the determined identifier 160 are transmitted to the external entity 115.

In another embodiment, in step 215, the message can also be transmitted from the first terminal 105 to the external entity 115 without the identifier having previously been determined by the first terminal 105. This identifier may then be determined by the external entity 115 and may be transmitted back to the first terminal 105 and stored there. In both variants described, the identifier is finally present on both sides 105, 115.

In a step 220, the communication profile 185 can be used by the first terminal 105 can be used actively by transmitting data or call information or can be used passively by establishing reachability of the first terminal 105. At this point, a connection of the communication device 145 of the first terminal 105 may be temporarily unavailable. In this time, the second terminal 110 may activate the communication profile 185, for which purpose it can carry out the same method as the first terminal 105 and can transmit a corresponding message to the external entity 115. The latter can react with a deactivation request for the first terminal 105, as shown in yet more detail below.

In a step 225, the first terminal 105 can receive a deactivation request from the external entity 115. The identifier 160 of the activation which was last received by the external entity 115 from this terminal 105 is enclosed with this deactivation request.

In a step 230, the first terminal 105 can check whether the received identifier 160 corresponds to the identifier 160 which was determined in step 210 or received in response to step 215 and was stored locally. If this is the case, a second device 110 has not been activated after activation of the first device 105 in step 210 and the deactivation request can be complied with in a step 235. Otherwise, if the identifiers 160 do not correspond to one another, the deactivation request can be determined to be out of date and can be rejected or ignored. The first terminal 105 can continue with use of the communication profile 185 in step 220.

The external entity 115 can receive the message from the first terminal 105 relating to activation in a step 250. An identifier 160 may be enclosed with the message or the external entity 115 may determine an identifier 160 and transmit it back to the first terminal 105. Yet further information may be enclosed with the message from the first terminal 105, in particular an indication of the terminal 105 or a surrounding or connected device such as the first vehicle 120.

In a step 255, the external entity 115 can determine whether further activation of the communication profile 185 is active. For this purpose, it can determine whether there is locally an identifier 160 of activation of the communication profile 185. If this is the case, the external entity 115 can transmit, in a step 260, a deactivation request to that terminal 105, 110 from which the activation message whose identifier is still present came. In order to address the deactivation request to the correct terminal 105, 110, an indication of the activating terminal 105, 110, which was received when running through step 250 in the past, can be evaluated, in particular. The transmitted identifier 160 may be deleted. The identifier 160 received by the first terminal 105 may be stored locally.

The method 200 can also be carried out in a corresponding manner with more than two terminals 105, 110.

REFERENCE NUMERALS

100 System
105 First mobile terminal
110 Second mobile terminal
120 First vehicle
125 Second vehicle
130 Communication device
135 Processing device
140 Storage device
145 Communication device
150 Processing device
155 Storage device
160 Identifier
165 Communication device
170 Processing device
175 Storage device
180 Identifier
200 Method
205 Activate communication profile
210 Generate identifier K++
215 Notify: activation of K
220 Use communication profile
225 Receive deactivation request for activation of N
230 N=K?
250 Receive notification of activation of K
255 Activation of N≠K already active?
260 Transmit deactivation request for activation of N

What is claimed is:

1. A method for controlling a mobile terminal comprising:
activating a communication profile of the mobile terminal;
transmitting a notification relating to the activation to an external entity;
storing an identifier for the activation, the stored identifier including a serial number and a timestamp that indicates at which time the communication profile is activated;
receiving a deactivation request and an identifier; and deactivating the communication profile if the received identifier corresponds to the stored identifier;
wherein the received identifier is determined by the mobile terminal and is transmitted from the mobile terminal to the external entity;
wherein the deactivation request has a predetermined lifetime and is deleted after the predetermined lifetime has expired; and
wherein the predetermined lifetime is individually assigned to the deactivation request.

2. The method according to claim 1, wherein
the notification comprises an identification of the mobile terminal.

3. The method according to claim 1, wherein
during proactive deactivation of the communication profile, the mobile terminal transmits a deactivation request containing the identifier to the external entity; and
the external entity is configured to delete the stored identifier.

4. A mobile terminal comprising:
a communication device to communicate with an external entity;
a storage device to store an identifier; and
a processing device configured to perform the method of claim 1.

5. A motor vehicle comprising a mobile terminal according to claim 4.

6. A method for controlling an external entity comprising:
receiving, by the external entity, a notification from a mobile terminal relating to its activation of a communication profile;
storing an identifier assigned to the activation, the stored identifier including a serial number and a timestamp that indicates at which time the communication profile is activated;
determining whether there is an identifier of activation of the same communication profile by another mobile terminal; and
based on the determining: transmitting a deactivation request and the identifier to the other mobile terminal; and
deleting the transmitted identifier; wherein the transmitted identifier is determined by the mobile terminal and is transmitted from the mobile terminal to the external entity;
wherein the deactivation request has a predetermined lifetime and is deleted after the predetermined lifetime has expired; and
wherein the predetermined lifetime is individually assigned to the deactivation request.

7. An external entity comprising:
a communication device to communicate with a first and a second mobile terminal;
a storage device to store identifiers; and
a processing device configured to perform the method of claim 6.

* * * * *